(12) United States Patent
Jones et al.

(10) Patent No.: US 7,406,758 B2
(45) Date of Patent: Aug. 5, 2008

(54) APPARATUS AND METHODS FOR MANUFACTURING OPERATIONS

(75) Inventors: Darrell D. Jones, Mill Creek, WA (US); James N. Buttrick, Jr., Seattle, WA (US); Theodore Boyl-Davis, Snohomish, WA (US); Roger Gage, Marysville, WA (US); Laurance N. Hazlehurst, Seattle, WA (US)

(73) Assignee: The Boeing Company, Chicago, IL (US)

( * ) Notice: Subject to any disclaimer, the term of this patent is extended or adjusted under 35 U.S.C. 154(b) by 580 days.

(21) Appl. No.: 10/903,713

(22) Filed: Jul. 30, 2004

(65) Prior Publication Data

US 2005/0132560 A1    Jun. 23, 2005

Related U.S. Application Data

(60) Provisional application No. 60/500,863, filed on Sep. 5, 2003.

(51) Int. Cl.
*B23B 45/14* (2006.01)
(52) U.S. Cl. ............... 29/34 B; 408/76; 408/88; 408/1 R; 409/178; 248/205.5; 248/206.3; 248/362
(58) Field of Classification Search ............... 409/178, 409/175; 408/76, 1 R, 88; 29/34 B; 248/205.5, 248/205.6, 205.7, 205.8, 205.9, 362–363, 248/206.3
See application file for complete search history.

(56) References Cited

U.S. PATENT DOCUMENTS

| | | | | |
|---|---|---|---|---|
| 2,910,895 A | * | 11/1959 | Winslow | 408/10 |
| 3,285,102 A | * | 11/1966 | De Voss | 408/14 |
| 3,627,436 A | * | 12/1971 | Adams et al. | 408/63 |
| 3,697,112 A | * | 10/1972 | Nielson et al. | 294/65 |
| 3,716,307 A | * | 2/1973 | Hansen | 417/191 |
| 4,582,460 A | * | 4/1986 | Silverberg et al. | 409/175 |
| 4,828,306 A | | 5/1989 | Blatt | |
| 5,201,560 A | | 4/1993 | Golden | |
| 5,468,099 A | * | 11/1995 | Wheetley et al. | 408/1 R |
| 5,681,022 A | * | 10/1997 | Rankin | 248/363 |
| 5,697,413 A | * | 12/1997 | Fuller | 144/356 |
| 5,807,034 A | * | 9/1998 | Perlmutter et al. | 408/67 |
| 6,129,489 A | * | 10/2000 | Linderholm | 409/178 |
| 6,158,666 A | * | 12/2000 | Banks et al. | 238/10 R |

(Continued)

FOREIGN PATENT DOCUMENTS

FR    2673133 A1  *  8/1992

(Continued)

*Primary Examiner*—Daniel W Howell
(74) *Attorney, Agent, or Firm*—Lee & Hayes, PLLC

(57) ABSTRACT

Apparatus and methods for manufacturing operations are disclosed. In one embodiment, a vacuum cup assembly includes a housing having a vacuum generator formed therein, and a compliant sealing member coupled to the housing. The vacuum generator is coupleable to a source of pressurized fluid and is adapted to generate a reduced pressure region. The sealing member forms an enclosable region in fluid communication with the reduced pressure region. In another embodiment, a method of performing a manufacturing operation includes installing a coordinating pin into an indexing hole, the coordinating pin including a quantum of indexing information. The quantum of indexing information is sensed, and a manufacturing operation is performed based at least partially on the quantum of indexing information.

16 Claims, 9 Drawing Sheets

U.S. PATENT DOCUMENTS

| | | |
|---|---|---|
| 6,210,084 B1 | 4/2001 | Banks et al. |
| 6,382,889 B1 * | 5/2002 | Brown et al. ................. 409/175 |
| 6,467,385 B1 * | 10/2002 | Buttrick et al. ............... 83/745 |
| 6,494,307 B1 * | 12/2002 | Kozak et al. ............. 198/465.1 |
| 6,843,328 B2 * | 1/2005 | Boyl-Davis et al. ........... 173/32 |
| 6,855,099 B2 * | 2/2005 | Hazlehurst et al. ............ 483/38 |
| 7,108,459 B1 * | 9/2006 | Mueller ..................... 408/112 |
| 7,137,760 B2 * | 11/2006 | Boyl-Davis et al. ......... 408/1 R |
| 2003/0230694 A1 * | 12/2003 | Kalb .......................... 248/363 |
| 2004/0265078 A1 * | 12/2004 | Boyl-Davis et al. ......... 408/1 R |

FOREIGN PATENT DOCUMENTS

WO    WO 03/037564    5/2003

* cited by examiner

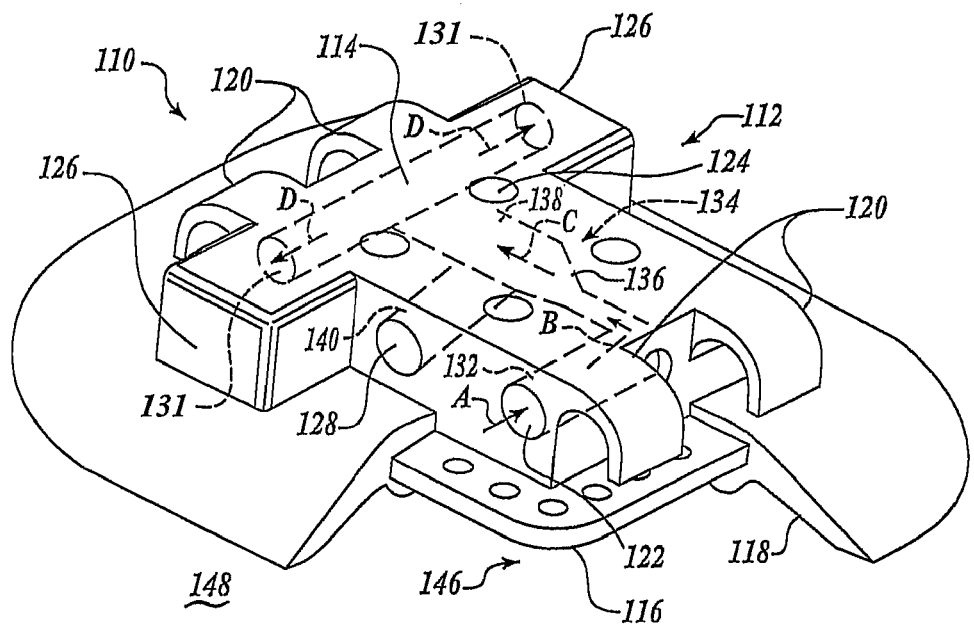
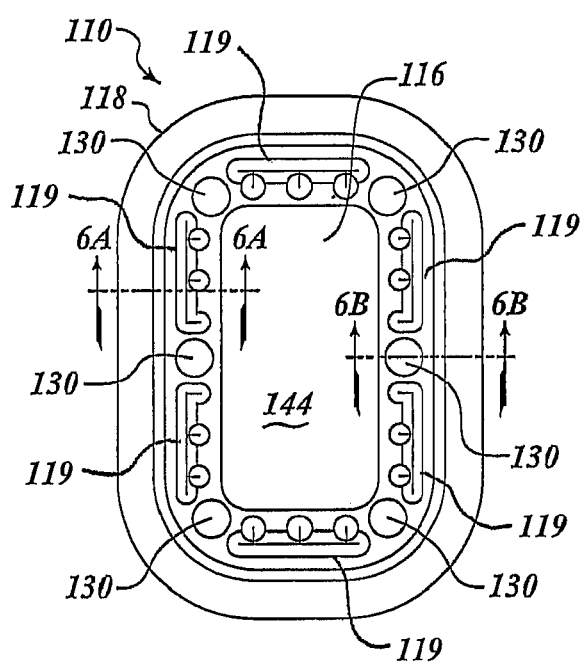 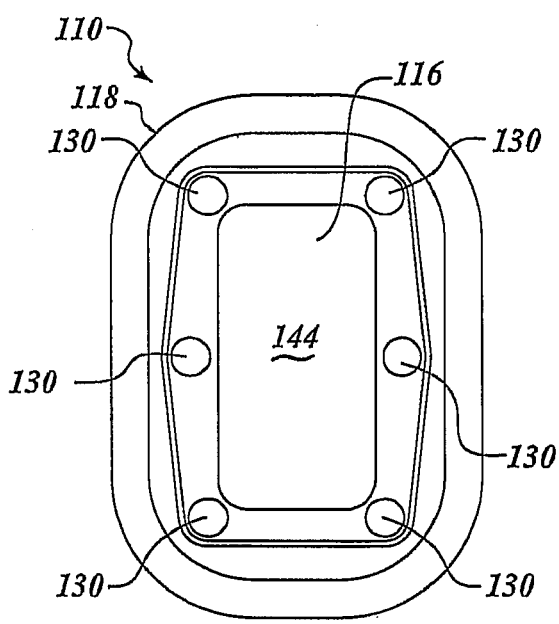
FIG.3
FIG.4      FIG.5

APPARATUS AND METHODS FOR MANUFACTURING OPERATIONS

PRIORITY CLAIM

This application claims priority from U.S. Provisional Application Ser. No. 60/500,863, filed Sep. 5, 2003, which is hereby incorporated by reference.

FIELD OF THE INVENTION

The present disclosure relates to apparatus and methods for manufacturing operations, and more specifically, to manufacturing operations employing vacuum devices, and to manufacturing operations that employ an indexing system based on pin locations.

BACKGROUND OF THE INVENTION

Manufacturing operations in many fields typically require accurate positioning of manufacturing tools over a workpiece. The manufacturing environment and the structural details of the workpiece often make it difficult to properly position the manufacturing tool relative to the workpiece to achieve the desired manufacturing operation with the necessary degree of accuracy. This is particularly true in the field of aircraft manufacturing, wherein a large number of manufacturing operations are typically needed on a variety of contoured surfaces. Similar difficulties may be encountered, for example, in the manufacture of ships, railcars, missiles, sheet metal buildings, and other similar structures.

It is known that a support assembly that supports a manufacturing tool may be temporarily attached to a surface of the workpiece in order to facilitate manufacturing operations on the workpiece. Some conventional support assemblies utilize one or more elongated rails equipped with vacuum cup assemblies for temporarily attaching the support assembly to the workpiece, including, for example, those assemblies generally disclosed in U.S. Pat. No. 6,467,385 B1 issued to Buttrick et al., and U.S. Pat. No. 6,210,084 B1 issued to Banks et al. In such conventional support assemblies, the rails may be coupled to the workpiece using the vacuum cup assemblies over a desired section of the workpiece, and then a manufacturing tool may be mounted on a carriage that is moveable along the rails. The carriage may then be traversed along the rails in a manual or automated fashion, and the desired manufacturing operations may be performed.

Vacuum for the vacuum cup assemblies of such conventional support assemblies is typically generated externally from the point-of-use, such as by a vacuum pump or other suitable source. The vacuum is then routed to each vacuum cup assembly by one or more vacuum lines. In order to isolate one vacuum circuit from another it is usually necessary to run separate, multiple lines to each vacuum cup assembly, or incorporate a valve network to isolate one line from another. Because the pressure differential along the length of each vacuum line is at most one atmosphere, care must be taken to avoid line losses which may degrade the degree of vacuum provided to the vacuum cup assemblies. One conventional approach to solving this line-loss problem is to provide a portable vacuum pump that may be transported along with the vacuum assembly in order to reduce the lengths of the vacuum lines between the vacuum pump and the vacuum cup assemblies.

Traditional hard tooling and indexing systems for large-scale manufacturing operations typically involve the construction of large, "monument like" equipment that provides support and indexing during manufacturing operations on a workpiece. Such structures are typically very expensive to design, build, and maintain. For example, the tooling for a new airplane manufacturing operation may comprise a substantial percentage of the initial investment cost of the manufacturing facilities needed to produce the aircraft.

Although desirable results have been achieved using the prior art manufacturing methods and apparatus, there is still room for improvement. Namely, it may yet be possible to improve the operating efficiency, cost, and performance of such manufacturing operations.

SUMMARY OF THE INVENTION

The present invention is directed to apparatus and methods for manufacturing operations, and more specifically, to manufacturing operations employing vacuum devices, and to manufacturing operations that employ an indexing system based on pin locations. Apparatus and methods in accordance with the present invention may advantageously improve the efficiency, throughput, and accuracy of manufacturing operations on a workpiece.

In one embodiment, a vacuum cup assembly for supporting a manufacturing assembly on a workpiece includes a housing having a vacuum generator formed therein, and a compliant sealing member coupled to the housing. The vacuum generator is coupleable to a source of pressurized air and includes an internal flow duct adapted to expand a flow of pressurized air to generate a reduced pressure region. The sealing member projects outwardly from the housing and at least partially forms an enclosable region between the housing and the workpiece. The enclosable region is in fluid communication with the reduced pressure region so that a reduced pressure may be formed within the enclosable region when the flow of pressurized air is expanded.

In another embodiment, a method of performing a manufacturing operation on a workpiece includes forming an indexing hole in the workpiece and installing a coordinating pin into the indexing hole, the coordinating pin including a quantum of indexing information. A sensor is positioned proximate the coordinating pin, and the quantum of indexing information is sensed with the sensor. A manufacturing operation is then performed on the workpiece based at least partially on the quantum of indexing information.

BRIEF DESCRIPTION OF THE DRAWINGS

The preferred and alternative embodiments of the present invention are described in detail below with reference to the following drawings.

FIG. 3 is an upper isometric, partial cross-sectional view of a vacuum cup assembly in accordance with an embodiment of the invention;

FIG. 4 is a top elevational view of a retaining plate and a sealing member of the vacuum cup assembly of FIG. 3;

FIG. 5 is a bottom elevational view of the retaining plate and the sealing member of FIG. 4;

DETAILED DESCRIPTION OF THE INVENTION

The present invention relates to apparatus and methods for manufacturing operations, and more specifically, to manufacturing operations employing vacuum devices, and to manufacturing operations that employ an indexing system based on pin locations. Many specific details of certain embodiments of the invention are set forth in the following description and in FIGS. 1-17 to provide a thorough understanding of such embodiments. One skilled in the art, however, will understand that the present invention may have additional embodiments, or that the present invention may be practiced without several of the details described in the following description.

Figure 1:
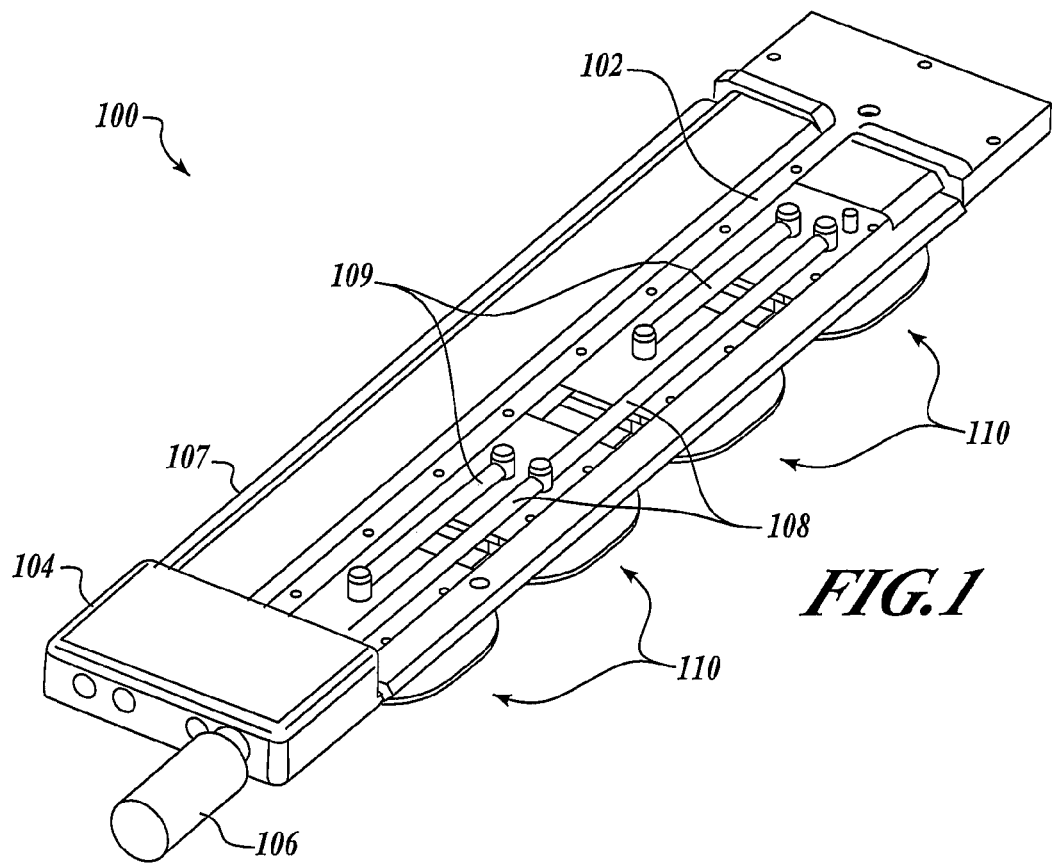
FIG. 1 is an upper isometric view of a vacuum support assembly having a plurality of vacuum cup assemblies in accordance with an embodiment of the invention.
Figure 2:
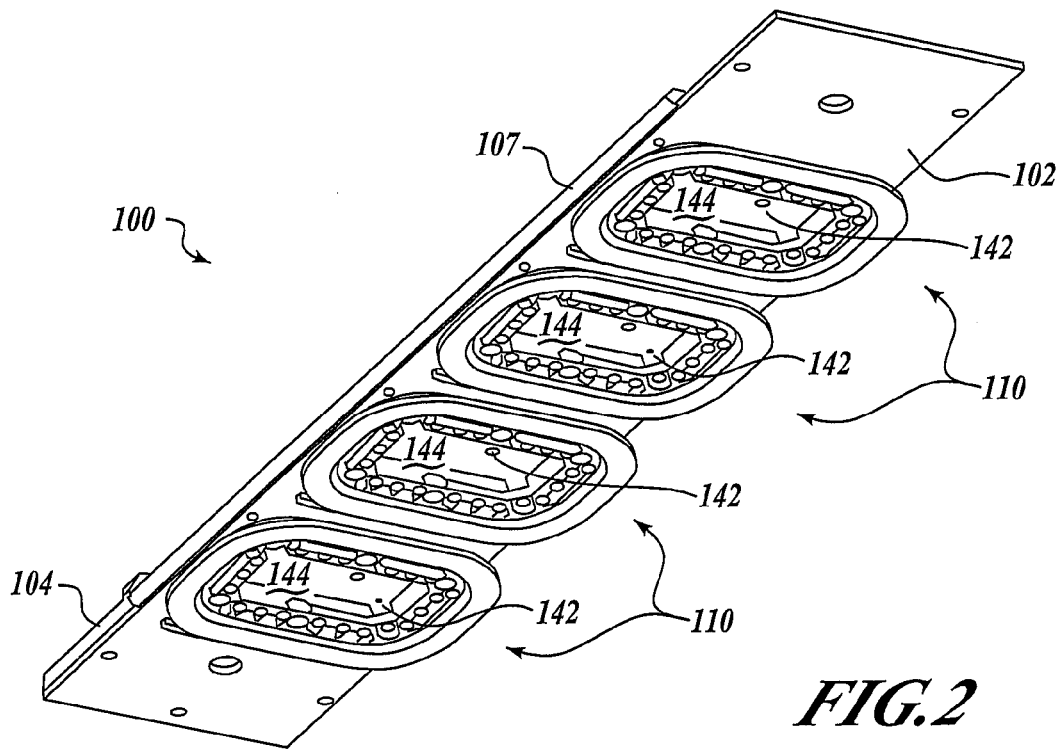
FIG. 2 is a lower isometric view of the vacuum support assembly of FIG. 1.
Figure 6A:
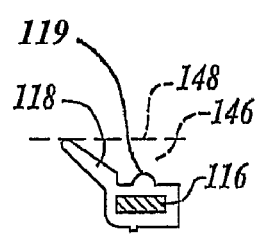
FIG. 6 shows partial cross-sectional views of the retaining plate and the sealing member of FIG. 4.
Figure 6B:
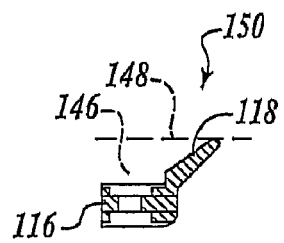
Figure 6C:
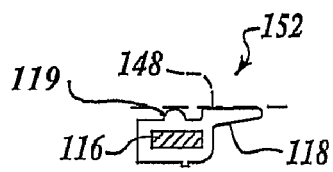
Figure 6D:
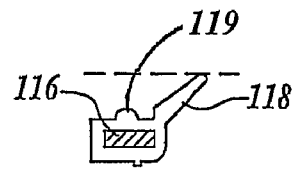

FIGS. 1 and 2 are upper and lower isometric views, respectively, of a vacuum support assembly 100 having a plurality of vacuum cup assemblies 110 in accordance with an embodiment of the invention. In this embodiment, the vacuum support assembly 100 includes a rack 102 to which the vacuum cup assemblies 110 are attached. An intake manifold 104 having an intake port 106 is mounted at a first end of the rack 102. A cover (or muffler) 107 extends along the length of the rack 102, as described more fully below. An air supply line 108 extends from the manifold 104 to one or more of the vacuum cup assemblies 110. Similarly, vacuum lines 109 extend between adjacent vacuum cup assemblies 110.

FIG. 3 is an upper isometric, partial cross-sectional view of a vacuum cup assembly 110 in accordance with an embodiment of the invention. In this embodiment, the vacuum cup assembly 110 includes a vacuum generator 112 having a housing 114 with a retaining plate 116 coupled to a sealing member 118. The housing 114 includes a pair of tube clips 120 extending from opposing ends thereof, and a plurality of attachment holes 124 (four shown) are disposed in the housing 114 to facilitate the attachment of the housing 114 to the rack 102 (e.g by bolts or other suitable attachment members). An air supply port 122 is disposed in the housing 114 and is fluidly coupled to a high pressure portion 132 of an internal flow duct 134 (shown in phantom lines) disposed through the housing 114. In this embodiment, the high pressure portion 132 of the internal flow duct 134 leads to a venturi portion 136, and then to a low pressure portion 138. Finally, the internal flow duct 134 exits the housing 114 at a pair of exhaust ports 131 (shown in phantom lines). The housing 114 includes a pair of outwardly-depending exhaust mufflers 126 that at least partially shroud the air exhaust ports 131. Finally, an auxiliary vacuum port 128 is disposed in the housing 114 and is coupled by an auxiliary flow duct 140 (shown in phantom lines) to the low pressure portion 138 of the internal flow duct 114.

It will be appreciated that any suitable fluid medium may be used to operate the vacuum cup assemblies 110, and that the present invention is not limited to air as the operating fluid medium. For the sake of simplicity, however, throughout the following description, the term air will be used to refer to the operating fluid medium.

Figure 7:
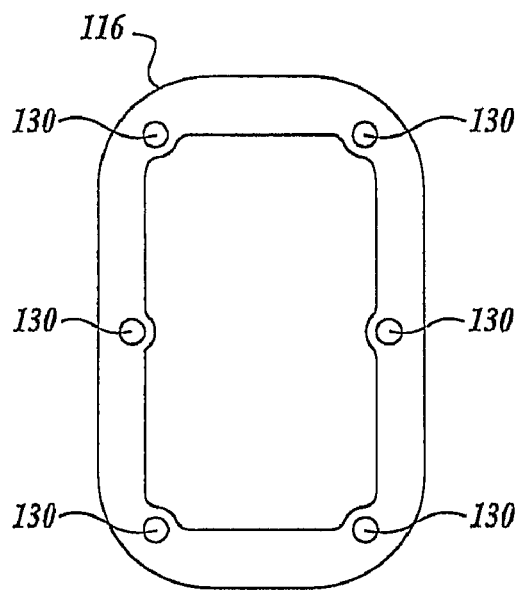
FIG. 7 is a top elevational view of a retaining plate of the vacuum cup assembly of FIG. 4.

FIGS. 4 and 5 are top and bottom elevational views, respectively, of the retaining plate 116 and the sealing member 118 of the vacuum cup assembly 110 of FIG. 3. FIG. 6 shows various partial cross-sectional views of the retaining plate 116 and the sealing member 118 of FIG. 4. FIG. 7 is a top elevational view of the retaining plate 116 of FIG. 4. As best shown in FIGS. 5 and 7, a plurality of coupling apertures 130 are disposed through the retaining plate 116 for coupling the retaining plate 116 (and the sealing member 118) to the housing 114 using fasteners (not shown).

In operation, a source of pressurized air is coupled to the intake port 106 of the vacuum support assembly 110. The pressurized air passed into the intake manifold 104 and then through the air line 108 to one or more of the vacuum cup assemblies 110. At the vacuum cup assembly 110, the pressurized air enters the air supply port 122 of the vacuum generator 112 (see arrow A) and passes through the high pressure portion 132 (see arrow B) of the internal flow duct 134. The pressurize air then expands through the venturi portion 136 and into the low pressure portion 138 (see arrow C) of the internal flow duct 134. The expanded air is exhausted from the internal flow duct 134 via the exhaust ports 130 (see arrows D) into the surrounding environment.

As best shown in FIG. 2, one or more vacuum ports 142 are disposed in a bottom surface 144 of the vacuum generator 112 and provide fluid communication between the low pressure portion 138 of the internal flow duct 134 and a suction chamber 146 formed between the vacuum cup assembly 110 and a workpiece 148 (see FIG. 3). As the pressurized air is expanded through the venturi portion 136, the low pressure portion 138, the exhaust ducts 130, and the suction chamber 146 formed between the vacuum cup assembly 110 and the workpiece 148 is exhausted (i.e. the pressure within the suction chamber 146 drops). As shown in FIG. 6, the sealing member 118 is flexible and bends from an initial non-deflected position 150 (FIG. 6(B)) prior to the reduction of pressure within the suction chamber 146, to a deflected position 152 (FIG. 6(C)) substantially in alignment with a foot 119 as the pressure within the suction chamber 146 is reduced and the vacuum cup assembly 110 is drawn closer to the workpiece 148. Thus, the plurality of vacuum cup assemblies 110 adhere to the workpiece 148 and support the vacuum support assembly 100 in a desired position on the workpiece 148.

It will be appreciated that a variety of different vacuum generator 112 configurations may be conceived, and that the vacuum generator is not limited to the particular configuration described above and shown in the accompanying figures. It will also be appreciated that the vacuum generator may be at least partially fabricated from known, conventional vacuum generators 112, including, for example, those vacuum generators offered as model number X5 vacuum generators by PIAB, Inc. of Hingham, Mass.

The vacuum cup assemblies 110 may provide several advantages over prior art vacuum cup assemblies. For example, because the vacuum cup assemblies 110 rely on pressurized air which is used to form the necessary pressure drop within the suction chamber 146 locally at each vacuum cup assembly 110, the vacuum support assembly 100 is far less sensitive to pressure losses than prior art assemblies. In contrast to such prior art assemblies, in which the maximum pressure differential along a vacuum line leading from a vacuum source to each vacuum cup assembly is one atmosphere (at most), in the vacuum support apparatus 100, the pressure differential along the air lines 108 leading to the vacuum cup assemblies 110 can be far greater than one atmosphere. Thus, the energy that can be transferred from the point of generation to the point of use though a given size of tube is far greater in embodiments of the present invention than in prior art assemblies. As a result, in positive pressure systems in accordance with the present invention, because the necessary vacuum can be generated at the vacuum cup assembly more efficiently than in the prior art vacuum-based systems, the apparatus in accordance with the present invention may operate more efficiently than comparable prior art systems. Also, because of the improved operational efficiencies, embodiments of the present invention may utilize relatively smaller, less bulky components (e.g. smaller diameter tubes), enabling vacuum support assemblies 100 in accordance with the present invention to be used in a wider variety of applications.

Furthermore, embodiments of vacuum support assemblies may be more robust and reliable in comparison with alternate, prior art vacuum support assemblies. Since the vacuum cup assemblies rely on pressurized air, and since the pressure differential within the air supply system for the pressurized air may greatly exceed one atmosphere, embodiments of the present invention may be far less sensitive to leakage and failure of a particular system component (e.g. a sealing member of a vacuum cup assembly). Thus, even in the event that one vacuum usage point (e.g. a vacuum cup assembly) becomes disabled, the reduced pressures within the suction chambers of the other vacuum cup assemblies 110 may remain relatively unaffected, and the vacuum support assembly 100 may continue to operate.

In addition, embodiments of the present invention advantageously eliminate the need for portable vacuum sources to accompany the vacuum support assembly, relying instead on more commonly-available sources of pressurized air. Thus, embodiments of the present invention may provide improved accessibility and ease of use in comparison with alternate, prior art assemblies.

It will be appreciated that a wide variety of support assemblies and manufacturing assemblies may be conceived that incorporate embodiments of apparatus in accordance with the present invention. Some embodiments of the present invention may advantageously use an integrated assembly of a vacuum cup, vacuum pump/generator, manifold, muffler and mounting system all-in-one. In alternate embodiments, this may be accomplished by using, for example, off-the-shelf components integrated into a common housing, or the generator and muffler may be physically fabricated into the backshell/housing of the vacuum cup. This compact and common design can easily be mounted and plumbed in many different configurations for various applications. In further embodiments, two or more vacuum cup assemblies 110 can share common a vacuum generator 112 and/or supply pressure line 108 to improve reliability, reduced flow requirements, assembly time and tubing lines.

Figure 8:
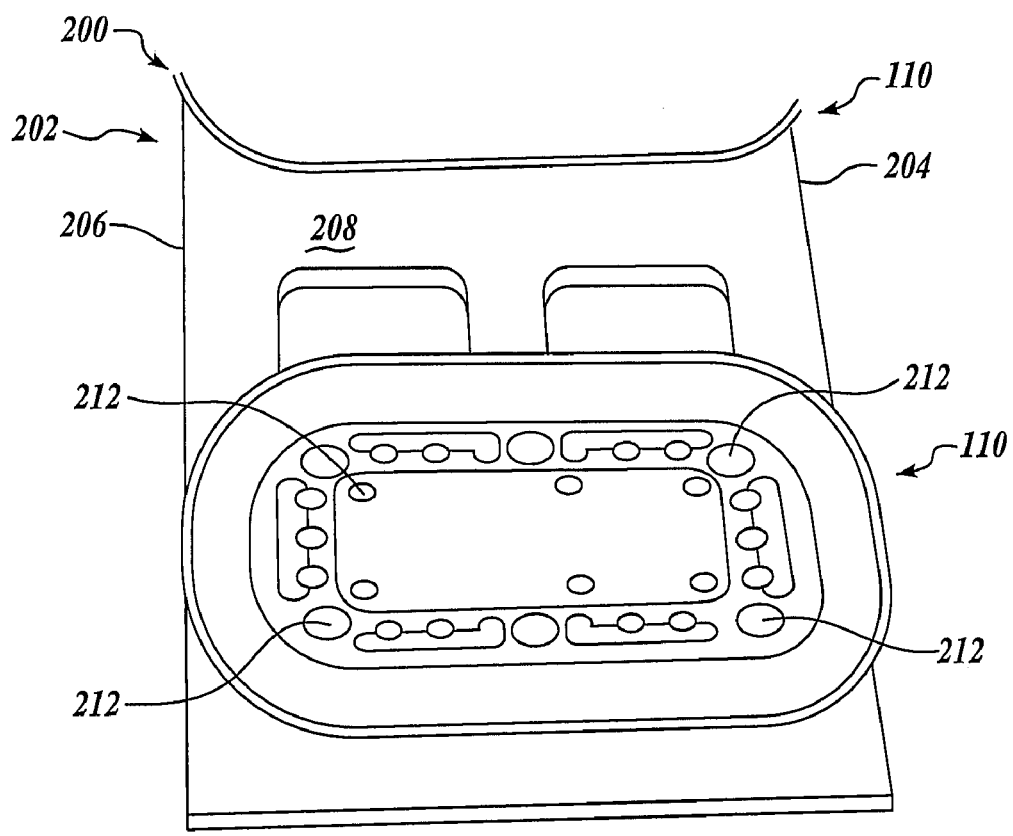
FIG. 8 is a lower isometric view of a rail assembly including a plurality of vacuum cup assemblies in accordance with an alternate embodiment of the invention.

For example, one possible embodiment is shown in FIG. 8, which provides a lower isometric view of a rail assembly 200 including a plurality of vacuum cup assemblies 110 in accordance with an alternate embodiment of the invention. In this embodiment, the rail assembly 200 includes a rail member 202 having first and second edges 204, 206. As described, for example, in the above-referenced U.S. Pat. No. 6,467,385 B1 issued to Buttrick et al., and U.S. Pat. No. 6,210,084 B1 issued to Banks et al., which patents are incorporated herein by reference, a manufacturing tool may be operatively coupled to at least one of the first and second edges 204, 206 of the rail member 202 for performing manufacturing operations on the workpiece 148.

Figure 9:
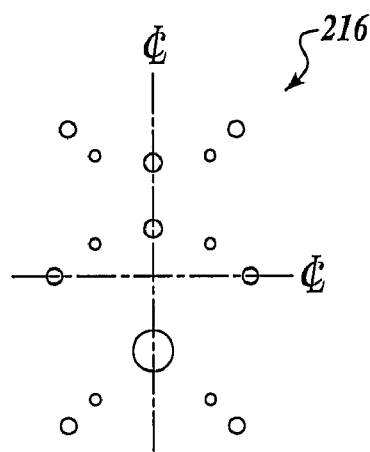
FIG. 9 is a schematic view of a first hole pattern in a rail member in accordance with an embodiment of the invention.
Figure 10:
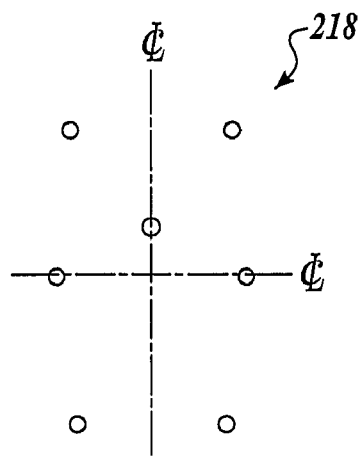
FIG. 10 is a schematic view of a second hole pattern in a rail member in accordance with an embodiment of the invention.

With continue reference to FIG. 8, the plurality of vacuum cup assemblies 110 are coupled directly to a lower surface 208 of the rail member 202 by fasteners 212 passing through the coupling apertures 130 (FIG. 7). The air lines 108 may extend along an upper surface 214 (not visible in FIG. 8) of the rail member 202, and may provide the necessary flow of pressurized air to the vacuum generators 112 of the vacuum cup assemblies 110 via air holes formed in the rail member 202. FIGS. 9 and 10 are schematic views of first and second hole patterns 216, 218, respectively, that may be formed in the rail member 202 for this purpose. Thus, the above-described advantages of embodiments of the present invention may be achieved in a rail assembly 200 as shown in FIGS. 8 through 10.

Figure 11:
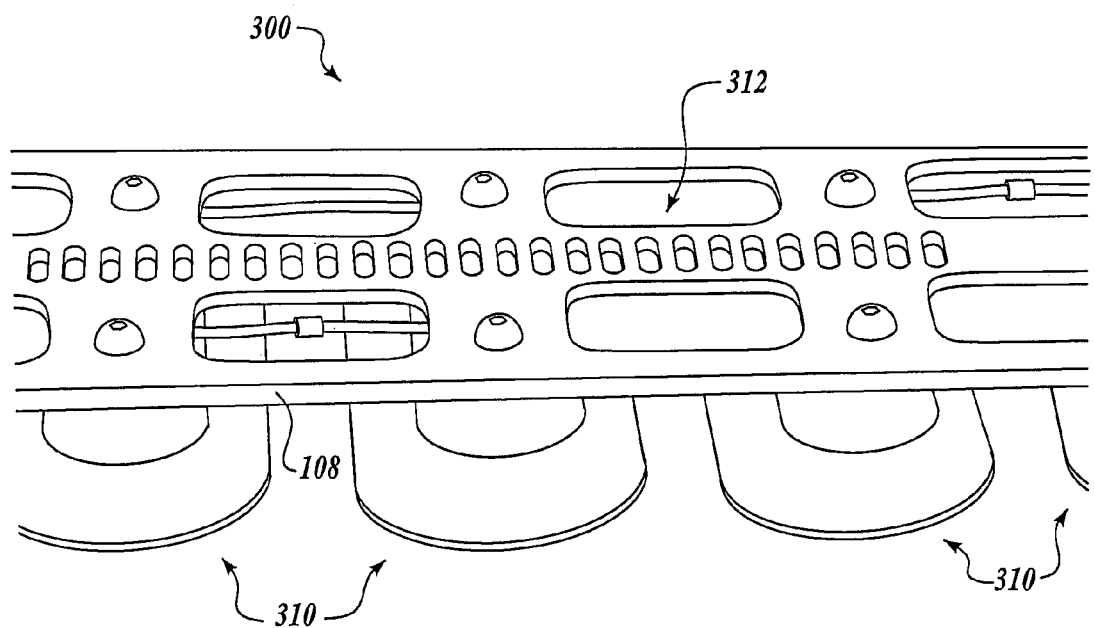
FIG. 11 is an upper isometric view of a rail assembly including a plurality of vacuum cup assemblies in accordance with another embodiment of the invention.

FIG. 11 is an upper isometric view of a rail assembly 300 including a plurality of vacuum cup assemblies 310 in accordance with another embodiment of the invention. In this embodiment, the vacuum cup assemblies 310 are coupled to a lower surface 308 of a rail member 302, and a vacuum generator 312 is disposed between and operatively coupled to a pair of adjacent vacuum cup assemblies 310. The air line 108 is coupled to the vacuum generator 312 and extends along the lower surface 308 of the rail member 302 (i.e. the same surface upon which the vacuum cup assemblies 310 are attached), thereby advantageously leaving the upper surface free from obstructions to facilitate the movement of manufacturing tools or carriage assemblies along the upper surface of the rail member 302.

Figure 12:
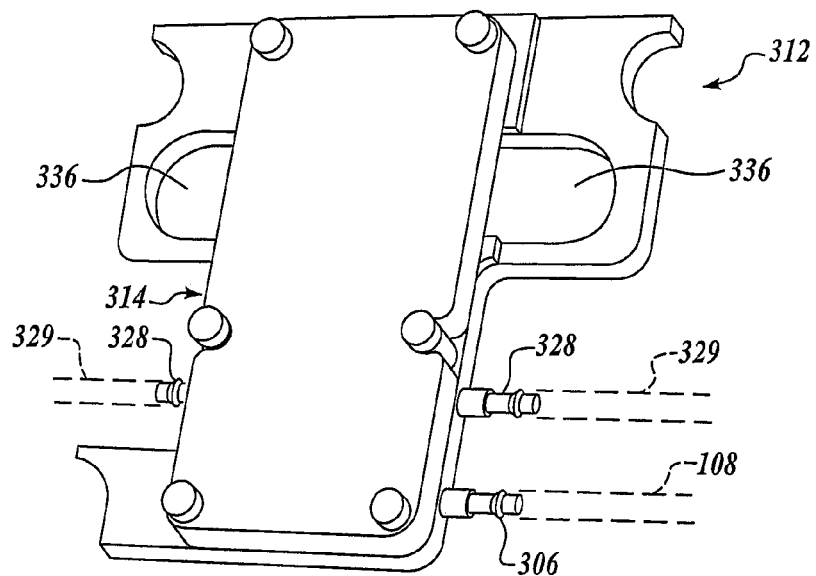
FIG. 12 is an isometric view of a vacuum generator of FIG. 11.

FIG. 12 is an isometric view of the vacuum generator 312 of FIG. 11. In this embodiment, the air line 108 is coupled to the intake port 306 so that pressurized air passes through the internal flow duct 334 disposed within the housing 314. A pair of vacuum ports 328 are fluidly coupled to the internal flow duct 334 (e.g. to the venturi portion 336 or the low pressure portion 338), and are in turn coupled to vacuum lines 329 which lead to the suction chamber 346 of each of the adjacent vacuum cup assemblies 310. As in the embodiment described above, the pressurized air exits the internal flow duct 334 via the exhaust apertures 330, which are at least partially shrouded by the shrouds 336. The above-noted advantages of embodiments of the present invention may thereby be achieved in a rail assembly 300 wherein a single vacuum generator 312 creates a reduced pressure (or vacuum) for a pair of adjacent vacuum assemblies as shown in FIGS. 11 and 12.

It will be appreciated that various additional embodiments of manufacturing apparatus incorporating one or more aspects of the present invention may be conceived in accordance with the present invention. Such apparatus may range from automated, computer controlled manufacturing apparatus, to relatively-simple manually-operated apparatus, and even to relatively simple, manually-driven apparatus. Representative manufacturing assemblies which may incorporate apparatus in accordance with the present invention include, but are not limited to, those manufacturing assemblies generally described in U.S. Pat. No. 4,850,763 issued to Jack et al., as well as the exemplary manufacturing assemblies disclosed in co-pending, commonly owned U.S. patent application Ser. No. 10/016,524 entitled "Flexible Track Drilling Machine" filed Dec. 10, 2001, co-pending, commonly-owned U.S. patent application Ser. No. 10/606,402 entitled "Apparatus and Methods for Servo-Controlled Manufacturing Operations" filed Jun. 25, 2003, co-pending, commonly-owned U.S. patent application Ser. No. 10/606,443 entitled "Methods and Apparatus for Counter-Balance Assisted Manufacturing Operations" filed Jun. 25, 2003, co-pending, commonly-owned U.S. patent application Ser. No. 10/606,472 entitled "Methods and Apparatus for Manufacturing Operations Using Opposing-Force Support Systems" filed Jun. 25, 2003, and co-pending, commonly-owned U.S. patent application Ser. No. 10/606,473 entitled "Apparatus and Methods for Manufacturing Operations Using Non-Contact Position Sensing" filed Jun. 25, 2003, which patents and patent applications are hereby incorporated by reference.

Figure 13:
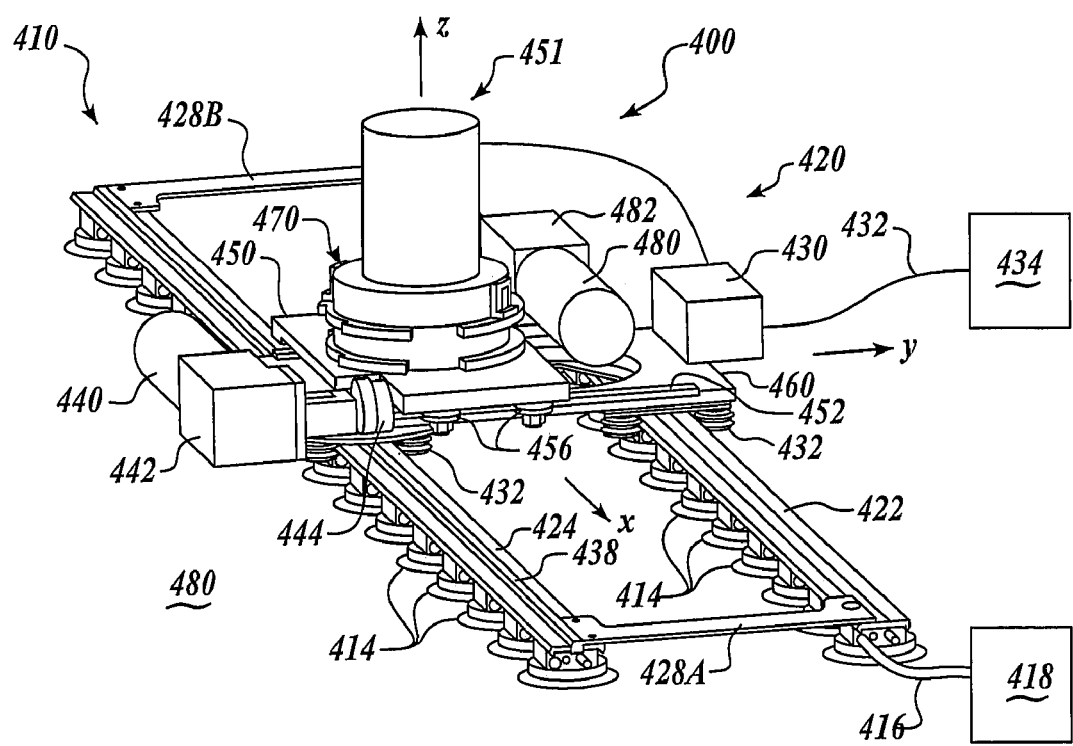
FIG. 13 is an isometric view of a representative manufacturing assembly in accordance with yet another embodiment of the invention.

FIG. 13 is an isometric view of a representative manufacturing assembly 400 in accordance with yet another embodiment of the invention. In this embodiment, the manufacturing assembly 400 includes a track assembly 410 controllably attachable to a workpiece 130, and a carriage assembly 420 moveably coupled to the track assembly 410. A secondary controller 430 is mounted on the carriage assembly 420 and is operatively coupled to a primary controller 434. At least one of the secondary controller 430 and the primary controller 434 may also be coupled to a manufacturing tool 451 mounted on the carriage assembly 420.

As further shown in FIG. 13, the track assembly 410 may include first and second rails 422, 424, each rail 422, 424 being equipped with a plurality of vacuum cup assemblies 414 in accordance with one or more embodiments of the present invention. The vacuum cup assemblies 414 are fluidly coupled to a supply line 416 leading to a source of pressurized fluid 418, such as a pump or the like, such that a reduced pressure may be formed in the suction chambers of the vacuum cup assemblies 414 as described above to secure the track assembly 410 to the workpiece 480.

The rails 422, 424 may be connected by one or more connecting members 428, and may be adapted to bend, twist, and flex to adjust to the contours of the workpiece 130. The carriage assembly 420 may translate along the rails 422, 424 by virtue of rollers 432 that are mounted on an x-axis carriage 460 of the carriage assembly 420 and engaged with the rails 422, 424. In a particular embodiment, each rail 422, 424 may have a V-shaped edge engaged by the rollers 32, and the rollers 32 may include V-shaped grooves that receive the V-shaped edges of the rails 422, 424. In another embodiment, the x-axis carriage 460 may be adapted to flex and twist as needed (i.e. as dictated by the contour of the workpiece 130) as the carriage assembly 420 traverses the rails 422, 422 to allow a limited degree of relative movement to occur between the x-axis carriage 430 and the rollers 432. Consequently, a reference axis of the carriage assembly 420 (in the illustrated embodiment, a z-axis normal to the plane of the x-axis carriage 460) may be maintained substantially normal to the workpiece 130 at any position of the carriage assembly 420 along the rails 422, 424.

As further shown in FIG. 13, a rack 438 for a rack and pinion arrangement is mounted along the rail 424. A first motor 440 and associated first gearbox 442 is mounted on the carriage assembly 420. An output shaft from the first gearbox 442 has a first pinion gear 444 mounted thereon which engages the rack 438 on the rail 424. Thus, rotation of the first pinion gear 444 by the first motor 440 drives the carriage assembly 420 along the rails 422, 424.

With continued reference to FIG. 13, the carriage assembly 420 further includes a y-axis carriage 450 slideably mounted atop the x-axis carriage 460 so that the y-axis carriage 450 can slide back and forth along a y-axis direction perpendicular to the x-axis direction. More particularly, rails 452, 454 are affixed to the opposite edges of the x-axis carriage 460, and rollers 456 are mounted on the y-axis carriage 450 for engaging the rails 452, 454. A rack 458 for a rack and pinion arrangement is affixed to the x-axis carriage 460 along the rail 454. A second motor 480 and associated second gearbox 482 are mounted on the y-axis carriage 450 and drive a second pinion gear (not shown) that engages the rack 458 to drive the y-axis carriage 450 in the y-axis direction. Additional aspects of the manufacturing assembly 400 are described in the above-referenced co-pending, commonly owned U.S. patent application Ser. No. 10/016,524 entitled "Flexible Track Drilling Machine" filed Dec. 10, 2001, previously incorporated by reference herein.

In operation, the manufacturing assembly 400 may be mounted onto the workpiece 130 by providing a flow of pressurized fluid medium from the source 418 to the vacuum cup assemblies 414 in a manner as described above. The carriage assembly 420 may then be moved to a desired position over the workpiece 130. Specifically, at least one of the primary and secondary controllers 434, 430 may transmit control signals to the first drive motor 440 to drive the carriage assembly 420 along the track assembly 410, and may also transmit control signals to the second drive motor 480 to adjust the position of the y-axis carriage 450 be coupled to the carriage assembly 420 by, for example, a clamp ring 470 or other suitable structure that provides access to the workpiece 130 for the manufacturing tool 451.

It should also be understood that the various operations of the manufacturing assembly 400 may be accomplished in an automated or semi-automated manner using computerized numerically-controlled (CNC) methods and algorithms. Alternately, the various operations of the manufacturing assembly 400 may be performed manually or partially-manually by an operator, such as, for example, by having the operator provide manual control inputs to the primary and/or secondary controllers 434, 430, or by temporarily disabling or neutralizing the above-referenced motors and drive assemblies to permit manual movement. In a particular aspect, at least one of the primary and secondary controllers 434, 430 includes a CNC control system. It may also be noted that manufacturing assemblies in accordance with the present invention, including the manufacturing assembly 400 described above, may be operated in combination with a wide variety of manufacturing tools 451, including but not limited to, drilling devices, riveters, mechanical and electromagnetic dent pullers, welders, wrenches, clamps, sanders, nailers, screw guns, or virtually any other desired type of manufacturing tools or measuring instruments.

Figure 14:
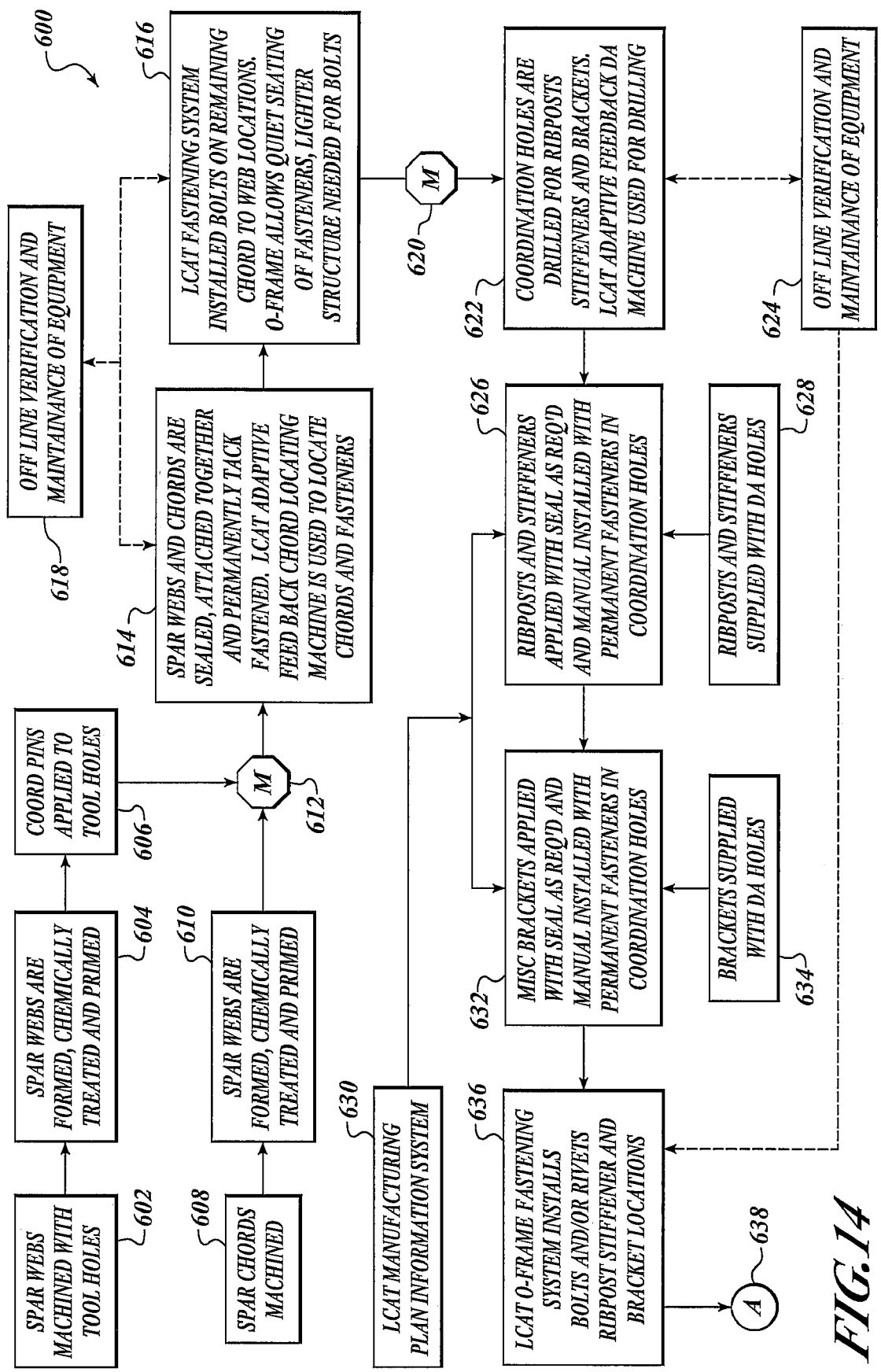
FIG. 14 is a flow chart of a first portion of a manufacturing process in accordance with an embodiment of the invention.
Figure 15:
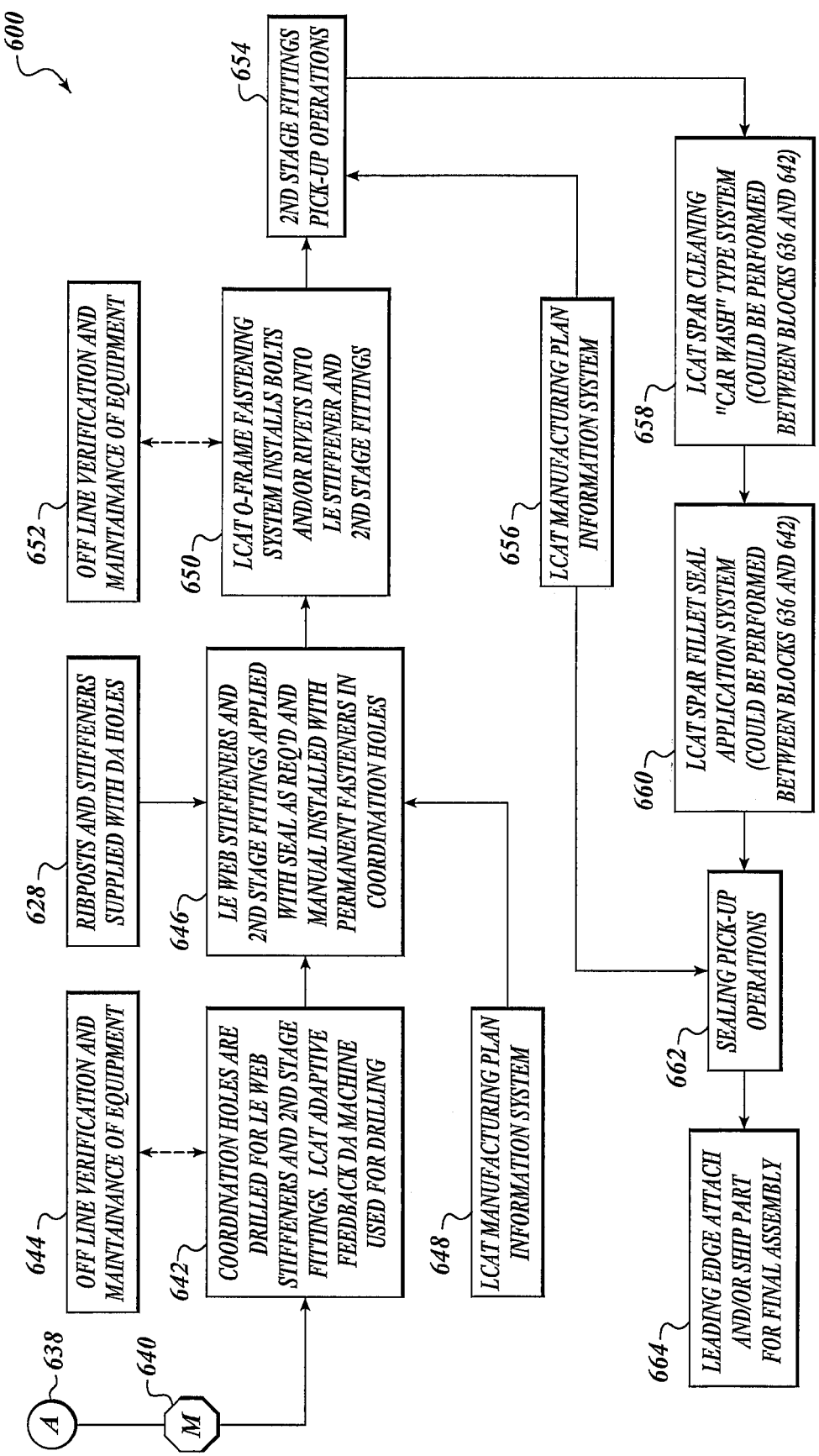
FIG. 15 is a flow chart of a second portion of a manufacturing process in accordance with an embodiment of the invention.

FIGS. 14 and 15 are flow charts of first and second portions, respectively, of a manufacturing process 600 that uses coordinate or "smart" pins in accordance with another embodiment of the invention. In this particular embodiment, the manufacturing process 600 is adapted for manufacture of wing spar of an aircraft wing assembly. It will be appreciated, however, that the manufacturing process 600 may alternately be adapted for the manufacture of any desired article of manufacture, and that embodiments of methods in accordance with the invention are not limited solely to the manufacture of a wing spar.

As shown in FIG. 14, the manufacturing process 600 may begin with the formation of tool holes in one or more spar webs at a block 602. The spar webs may then be at least one of formed, chemically treated, and primed at a block 604. At a block 606, one or more coordinate pins are applied (or installed) into the tool holes. As described more fully below, the coordinate pins (or smart pins) may remain installed in the tool holes throughout one or more subsequent actions of the manufacturing process 600, and may advantageously be used by one or more pieces of manufacturing equipment throughout the manufacturing process 600. The coordinate pins may, for example, be used to monitor spar growth, to locate spar features, to locate fasteners, to position sealant application machinery, to position automated wash and dry equipment, to obtain manufacturing plan information, or for any other suitable process or activity. At a block 608, the spar chords are machined, and at a block 610, the spar chords are at least one of formed, chemically treated, and primed. At a block 612, measurements of the spar are performed for quality control, and one or more of the blocks 602 through 608 may be repeated as necessary.

With continued reference to FIG. 14, at a block 614, the spar webs and chords are sealed, attached together, and permanently coupled (e.g. tack fastened), and a chord locating device may be used to locate the chords and fasteners. A fastening system may install bolts on remaining chord and web locations at a block 616. In a particular embodiment, an O-frame may be suitably employed to allow for quiet sealing of fasteners, and a lighter structure which may be suitable for bolts. An offline verification and maintenance of equipment may be performed at a block 618. Again, measurements of the spar may be performed at a block 620, and one or more previous steps may be repeated as needed.

Next, at a block 622, one or more coordinate holes may be drilled for ribposts, stiffeners, brackets, or other components. In one embodiment, a Low Cost Automation Technology (LCAT) adaptive feedback Determinant Assembly (DA) machine is used for these drilling operations. As used in this patent application, a DA machine is a machine that uses matching part-to-part features (e.g. holes, etc.) to assemble a product accurately versus using traditional locating jigs or special tools. At a block 624, an offline verification and maintenance of equipment may be performed. The ribposts and stiffeners may be sealed as required, and installed (e.g. manually) using permanent fasteners in corresponding coordination holes at a block 626. The ribposts and stiffeners may be provided with DA holes at a block 628. Relevant information regarding the manufacturing operation 600 may be transmitted to a manufacturing plan information system at a block 630. Similarly, at a block 632, one or more miscellaneous brackets may be sealed as required, and installed (e.g. manually) using permanent fasteners in corresponding coordination holes, and at a block 634, the brackets may be provided with DA holes. At a block 636, a fastening system installs fasteners at appropriate ribpost, stiffener, and bracket locations. Information from the offline verification and maintenance of equipment at the block 624 may be received into the block 636 for this purpose. In a particular embodiment, for example, an LCAT O-frame fastening system installs bolts and/or rivets during the block 636. The manufacturing process 600 continues at a block 638.

Referring now to FIG. 15, measurements of the wing spar may be performed at a block 640, and one or more previous steps may be repeated as needed. At a block 642, coordination holes may be formed for leading edge (LE) web stiffeners and second stage fittings. As described above, in one representative embodiment, an LCAT adaptive feedback DA machine is used for this purpose. Information may be transmitted to or received from an offline verification and maintenance of equipment at a block 644 (or from the block 624). Then, using the web stiffeners from the block 628, the web stiffeners and second stage fittings are sealed as required, and permanent fasteners installed in the coordination holes, at a block 646. At a block 648, information from the manufacturing plan information system may be provided to the block 646.

As further shown in FIG. 15, fasteners may be installed into the LE stiffeners and second stage fittings at a block 650. Again, information may be transmitted to or received from an offline verification and maintenance of equipment at a block 652 (or from the block 624). The second stage fittings pick-up operations are performed at a block 654. Again, at a block 656, information from the manufacturing plan information system may be provided to the block 654. A spar cleaning is performed at a block 658. In one particular embodiment, the cleaning may be a "car wash" type of cleaning. At a block 660, the spar fillet is sealed (e.g. with an application system). Sealing pick-up operations are performed at a block 662. Information may be provided at the block 662 from the manufacturing plan information system (block 656). Finally, at a block 664, at least one of a leading edge attachment and a shipping of the part for final assembly is performed.

Figure 16:
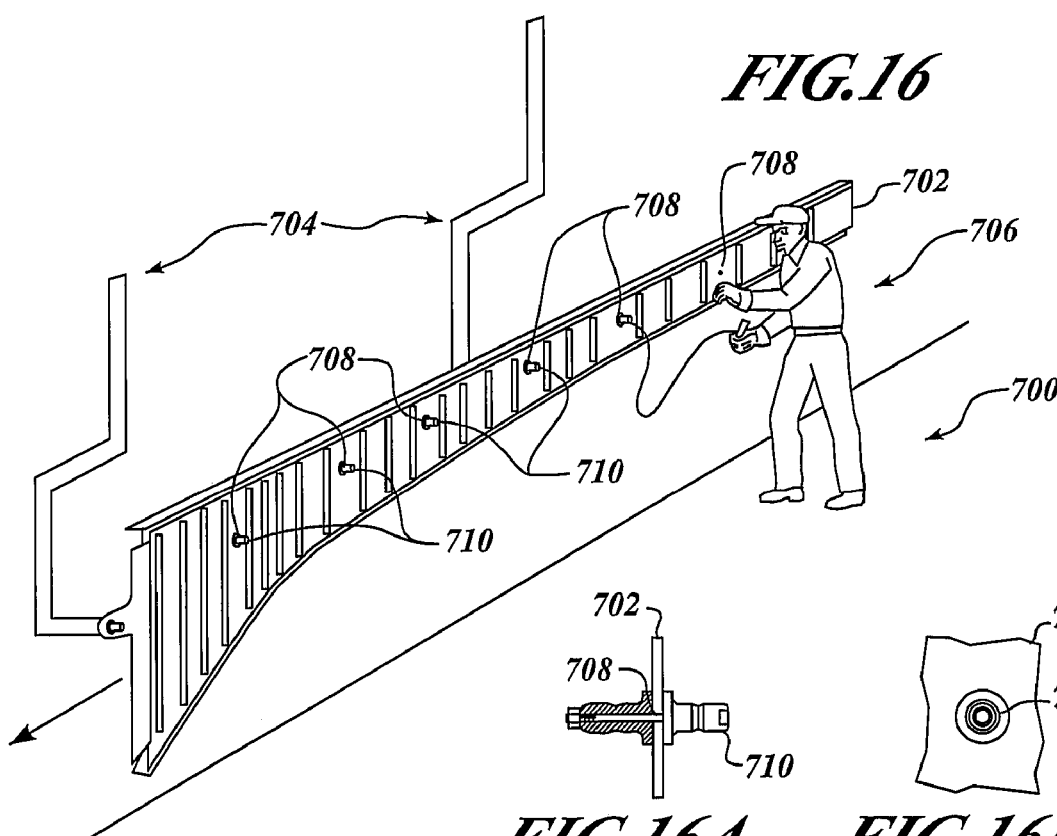
FIG. 16 is an isometric view of a manufacturing operation in accordance with yet another embodiment of the invention.
Figures 16A, 16B:
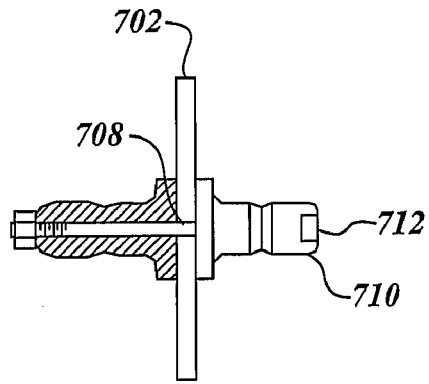

FIG. 16 is an isometric view of a manufacturing operation 700 in accordance with yet another embodiment of the invention. In this embodiment, a workpiece 702 (e.g. a wing spar) is being carried by handling equipment 704 while an operator 706 manually applies a plurality of coordinate pins (or smart pins or smart buttons) 710 into a corresponding plurality of holes 708 in the workpiece 702. The holes 708 may be formed by any desired method, including, for example, Determinant Spar Assembly Cell (DSAC), Automated Spar Assembly Tool (ASAT), robot, milling machine, or any other suitable drilling device or method. The coordinate pins 710 may be installed in specific tool hole locations. In one embodiment, the coordinate pins 710 are so-called "quick disconnect" pins. In a particular embodiment, the coordinate pins 710 can include industry-standard HSK type machine tool holders to improve dimensional accuracy. Other suitable types of coordinate pin systems could also be used.

It may be noted that each of the coordinate pins 710 installed in the workpiece 702 may be individualized and may contain highly specific characteristics or identification information that is unique to the specified location of each respective coordinate pin 710. Therefore, placement of the coordinate pins 710 into the workpiece 702 may be checked and certified, for example, by a second operator or quality assurance inspector (not shown). The coordinate pins 710 may be kept in a precision equipment box and color-coded, or otherwise marked, for placement in a specific hole location 708. Also, upon completion of manufacturing operations on the workpiece 702, the coordinate pins 710 may be removeable and reusable for similar manufacturing operations on subsequent workpieces 702. For example, a process for installing the coordinate pins 710 could start by assigning a box containing a set of unique coordinate pins 710 to a specific workpiece 702 (e.g. a front wing spar Part No. IGW-200 for a Model 777 aircraft commercially-available from The Boeing Company of Chicago, Ill.). The coordinate pins 710 may be designated for their respective index hole 708 in the workpiece 702 by, for example, color coding of the pins, or cross-referencing numbers that are affixed or stamped on the pins, or any other suitable means. The operator 706 select the correct box of coordinate pins 710 to install for the respective workpiece 702, and then install each coordinate pin 710 into its corresponding index hole 708.

Figures 17A, 17B:
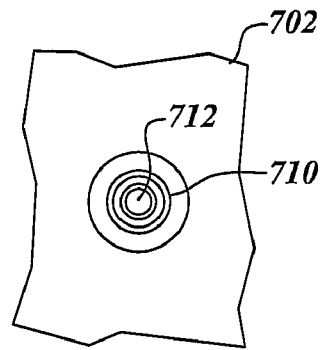
FIG. 17 shows enlarged, partial cross-sectional and end elevational views of a coordinate pin of FIG. 16, and a coordinate pin reader, in accordance with another embodiment of the invention.
Figure 17C:
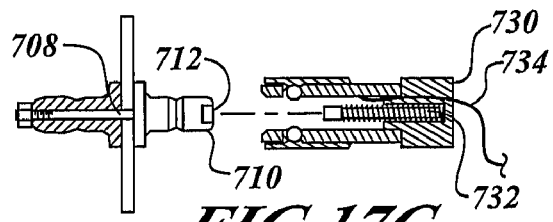
Figure 17D:
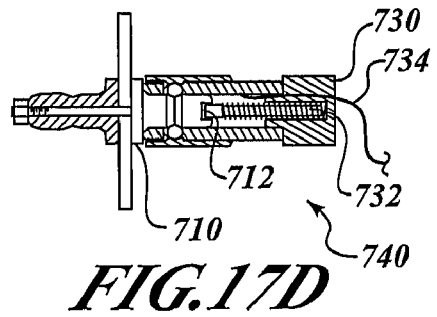

FIG. 17 shows enlarged, partial cross-sectional and end elevational views of a coordinate pin 710 of FIG. 16, and a coordinate pin reader 730, in accordance with another embodiment of the invention. As shown in FIG. 17, the coordinate pin 710 may include an identifier 712 containing identification information that may be useful in the performance of one or more actions of the manufacturing process 600 (FIGS. 14 and 15). In one embodiment, for example, the identifier 712 may be embedded within a tip portion of the coordinate pin 710. In an engaged position 740, the pin reader 730 may be engaged with the coordinate pin 710 so that a receiving member 732 of the pin reader 730 engages with the identifier 712 and receives the identification information contained therein. The identification information may be transmitted via a conductive lead 734 to a data acquisition system (not shown), a controller, a manufacturing plan information system, or other suitable data analysis and storage system.

In one particular embodiment, the identifier 712 may be a sensor that is embedded into the coordinate pin 710. A number of different types of contact and non-contact sensors are commercially-available that may be used for this purpose. For example, in one exemplary embodiment, a sensor known as a "smart button" available from Dallas Semiconductor, Inc. of Dallas, Tex. may be employed that is about the size of a typical watch battery and has a unique character string identifier that is embedded in a microchip. Each smart button is robust and costs only a few dollars. A smart button reader 730 can read the smart button's unique identifier by simply touching the surface of the smart button. An electrical micro voltage potential between the reader 730 and the button 710 provides the power source to read the button 710. Once the smart buttons 710 are installed then multiple pieces of manufacturing equipment can hook up to any of the coordinate pin locations and read the unique character string identifier for that location. The manufacturing system can then automatically look up the unique character identifier in a table, and may cross-reference the workpiece information for that location.

For example, in one representative embodiment, a piece of automated drilling equipment, such as the manufacturing assembly 400 described above and shown in FIG. 13, may be attached to the coordinate pin 710. The drilling equipment may include a pin reader 730 (e.g. in its secondary controller 430 or its manufacturing tool 451), and may download the identification information of the coordinate pin 710 to, for example, the primary controller 434. The primary controller 434 may perform the table look up on the identification information. The identification information may be cross-referenced to the workpiece of interest, and other various details about the manufacturing operation (e.g. airplane model, structure, station number, and data sets for that location). The primary controller 434 may then formulate one or more control signals to the carriage assembly 420 or the manufacturing tool 451 accordingly.

The identification information in the coordinate pin 710 may advantageously allow unique identification of each index hole 708 location so that manufacturing equipment will be better able to know where and what assembly operations are to be performed on the workpiece 702. For example, in the representative manufacturing process 600 shown in FIGS. 14 and 15, the coordinate pins 710 may be installed, for example, in the block 606. Subsequently, the coordinate pins 710 may be employed during various operations and sub-processes of the manufacturing process 600, including, for example, for monitoring spar growth, for locating spar features, to position sealant application machinery, to position washing and drying equipment, to obtain manufacturing plan information, and during any other suitable operation or sub-process. More specifically, in the manufacturing process 600 shown in FIGS. 14 and 15, the coordinate pins 710 may be used in numerous processes and sub-processes, including, for example, in blocks 614 through 624, in block 630, in blocks 636 and 642, in block 650, and in blocks 656 through 660.

Furthermore, the coordinate pins 710 may remain in the workpiece 702 as the workpiece 702 progresses beyond the manufacturing process 600. In a particular embodiment, for example, the coordinate pins 710 remain in the wing spar 702 after a spar assembly process and into a wing majors assembly process. The wing majors assembly process may use the coordinate pins for the same or similar purposes and uses as during the manufacturing process 600. When manufacturing operations are complete, the coordinate pins 710 may be finally removed and recycled for the next workpiece 702. Thus, the coordinate pins 710 may advantageously establish a common index throughout a production process.

Embodiments of apparatus and methods that include indexing in accordance with the teachings of the present invention may allow a dramatic reduction or elimination of at least some of the traditional tools and traditional "monument like" equipment involved in conventional manufacturing processes. Embodiments of methods and apparatus disclosed herein may be relatively lower cost, relatively simple, and relatively flexible and adaptable in comparison with prior art manufacturing apparatus and methods. Traditional hard tooling and indexing systems are relatively more expensive to design, build, and maintain in comparison with the inventive indexing apparatus and methods disclosed herein. Since tooling for large manufacturing operations, such as a new airplane, typically comprises a substantial percentage of the capital investment needed to begin manufacturing operations, the cost savings attributable to apparatus and methods in accordance with the present invention may be substantial.

It will also be appreciated that apparatus and methods in accordance with the present invention may also provide other advantages over prior art manufacturing apparatus and methods. For example, embodiments of the present invention may allow index locations to be identified relatively quickly, and may provide a convenient method for configuration control in automated processing operations. Also, embodiments of the present invention may provide a method for communicating key manufacturing instructions throughout the manufacturing process at relatively low cost and high reliability. Embodiments of the present invention may also provide a method of "mistake proofing" manufacturing operations to reduce or eliminate manufacturing errors.

While specific embodiments of the invention have been illustrated and described herein, as noted above, many changes can be made without departing from the spirit and scope of the invention. Accordingly, the scope of the invention should not be limited by the disclosure of the specific embodiments set forth above. Instead, the invention should be determined entirely by reference to the claims that follow.

What is claimed is:

1. A vacuum cup assembly for supporting a manufacturing assembly on a workpiece, comprising:

a housing having a vacuum generator formed therein and coupleable to a source of pressurized fluid, the vacuum generator including an internal flow duct disposed therein and adapted to expand a flow of pressurized fluid to generate a reduced pressure region within the internal flow duct, and an exhaust port adapted to release the flow of pressurized fluid from the internal flow duct following expansion; and a compliant sealing member coupled to the housing and projecting outwardly therefrom, the sealing member being adapted to at least partially form an at least partially enclosable region between the housing and the workpiece, the enclosable region being in fluid communication with the reduced pressure region so that a reduced pressure may be formed within the enclosable region when the flow of pressurized fluid is expanded, wherein the housing includes a retaining plate having at least one aperture disposed therethrough, the sealing member having a slotted portion being coupled around an outer peripheral edge of the retaining plate, the enclosable region fluidly communicating with the reduced pressure region through the at least one aperture, wherein the sealing member comprises a first sealing member and the enclosable region comprises a first enclosable region, and wherein the housing includes a first vacuum port in fluid communication between the reduced pressure region and the first enclosable region, the vacuum cup assembly further comprising a second compliant sealing member adapted to at least partially form a second at least partially enclosable region between the housing and the workpiece, the housing having a second vacuum port in fluid communication between the reduced enclosable region and the second enclosable region so that a second reduced pressure may be formed within the second enclosable region when the flow of pressurized fluid is expanded.

2. The vacuum cup assembly of claim 1, wherein the internal flow duct includes a venturi portion that expands the flow of pressurized fluid into the reduced pressure region.

3. The vacuum cup assembly of claim 1, wherein the sealing member includes a plurality of feet adjacent to an outer edge of the sealing member opposite the outer peripheral edge of the retaining plate, the plurality of feet configured to engage a workpiece when the reduced pressure is formed within the enclosable region.

4. A manufacturing assembly adapted for use on a workpiece, comprising:

a support member positionable proximate the workpiece, wherein the support member comprises a track assembly including a pair of elongated rails; and at least one vacuum cup assembly coupled to the support member and coupleable to the workpiece, the vacuum cup assembly including:

a housing having a vacuum generator formed therein and coupleable to a source of pressurized fluid, the vacuum generator including an internal flow duct disposed therein and adapted to expand a flow of pressurized fluid to generate a reduced pressure region within the internal flow duct, and an exhaust port adapted to release the flow of pressurized fluid from the internal flow duct following expansion; and a compliant sealing member coupled to the housing and projecting outwardly therefrom, the sealing member being adapted to at least partially form an at least partially enclosable region between the housing and the workpiece, the enclosable region being in fluid communication with the reduced pressure region so that a reduced pressure may be formed within the enclosable region when the flow of pressurized fluid is expanded, wherein the housing includes a retaining plate having at least one aperture disposed therethrough, the sealing member being coupled around an outer peripheral edge of the retaining plate, the enclosable region fluidly communicating with the reduced pressure region through the at least one aperture.

5. The manufacturing assembly of claim 4, further comprising a carriage assembly operatively coupled to the support member and moveable therealong.

6. The manufacturing assembly of claim 5, further comprising a controller operatively coupled to the carriage assembly and adapted to transmit one or more control signals to the carriage assembly to controllably position the carriage assembly with respect to the workpiece.

7. The manufacturing assembly of claim 4, further comprising a manufacturing tool operatively coupled to the support member and adapted to perform a manufacturing operation on the workpiece.

8. The manufacturing assembly of claim 7, wherein the manufacturing tool includes a drilling device.

9. The manufacturing assembly of claim 4, wherein the internal flow duct includes a venturi portion that expands the flow of pressurized fluid into the reduced pressure region.

10. The manufacturing assembly of claim 4, wherein the sealing member comprises a first sealing member and the enclosable region comprises a first enclosable region, and wherein the housing includes a first vacuum port in fluid communication between the reduced pressure region and the first enclosable region, the vacuum cup assembly further comprising a second compliant sealing member adapted to at least partially form a second at least partially enclosable region between the housing and the workpiece, the housing having a second vacuum port in fluid communication between the reduced enclosable region and the second enclosable region so that a second reduced pressure may be formed within the second enclosable region when the flow of pressurized fluid is expanded.

11. A method of performing a manufacturing operation on a workpiece, comprising:

providing at least one vacuum cup assembly proximate the workpiece;

coupling a support member to the at least one vacuum cup assembly;

operatively coupling a carriage assembly to the support member, the carriage assembly being adapted to be moveable along the support member;

providing a flow of a pressurized fluid to a vacuum generator portion of the vacuum cup assembly; and expanding at least a portion of the flow of pressurized fluid to create a reduced pressure region between the vacuum cup assembly and the workpiece, wherein providing at least one vacuum cup assembly proximate the workpiece includes providing at least one vacuum cup assembly having a compliant sealing member adapted to form an at least partially enclosable region proximate the workpiece, and wherein expanding at least a portion of the flow of pressurized fluid to create a reduced pressure region between the vacuum cup assembly and the workpiece includes expanding at least a portion of the flow of pressurized fluid to create a reduced pressure region within the partially enclosable region, wherein the compliant sealing member includes a plurality of feet adjacent to an outer edge of the compliant sealing member opposite the housing, the plurality of feet configured to provide a support for the workpiece when reduced pressure is experienced within the vacuum cup.

12. The method of claim 11, wherein providing a flow of a pressurized fluid to a vacuum generator portion includes providing a flow of a pressurized fluid to an internal flow duct having a reduced pressure portion adapted to expand at least a portion of the flow of pressurized fluid, and an exhaust port adapted to release the flow of pressurized fluid from the internal flow duct following expansion.

13. The method of claim 11, wherein expanding at least a portion of the flow of pressurized fluid includes expanding at least a portion of the flow of pressurized fluid through a venturi.

14. The method of claim 11, wherein the vacuum cup assembly includes a retaining plate having at least one aperture disposed therethrough, the compliant sealing member being coupled around an outer peripheral edge of the retaining plate, the retaining plate facilitating removal of the compliant sealing member from the vacuum cup assembly.

15. The method of claim 11, wherein coupling a support member to the at least one vacuum cup assembly includes coupling a track assembly including a pair of elongated rails to the at least one vacuum cup assembly.

16. The method of claim 11, further comprising operatively coupling a manufacturing tool to the carriage assembly.

* * * * *